Sept. 28, 1954  G. A. LYON  2,690,358
WHEEL COVER
Filed May 6, 1952  3 Sheets-Sheet 1
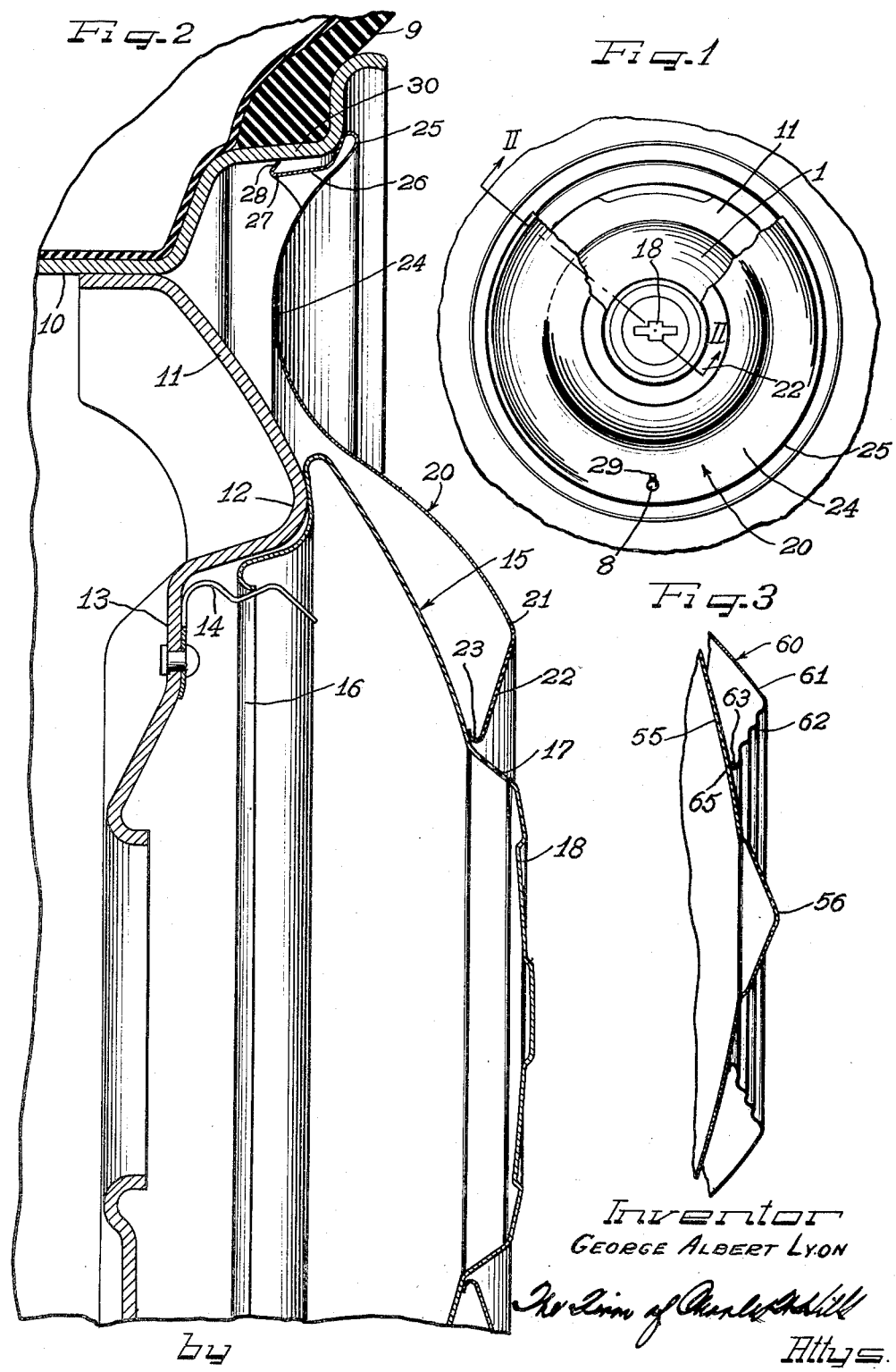
Inventor
GEORGE ALBERT LYON

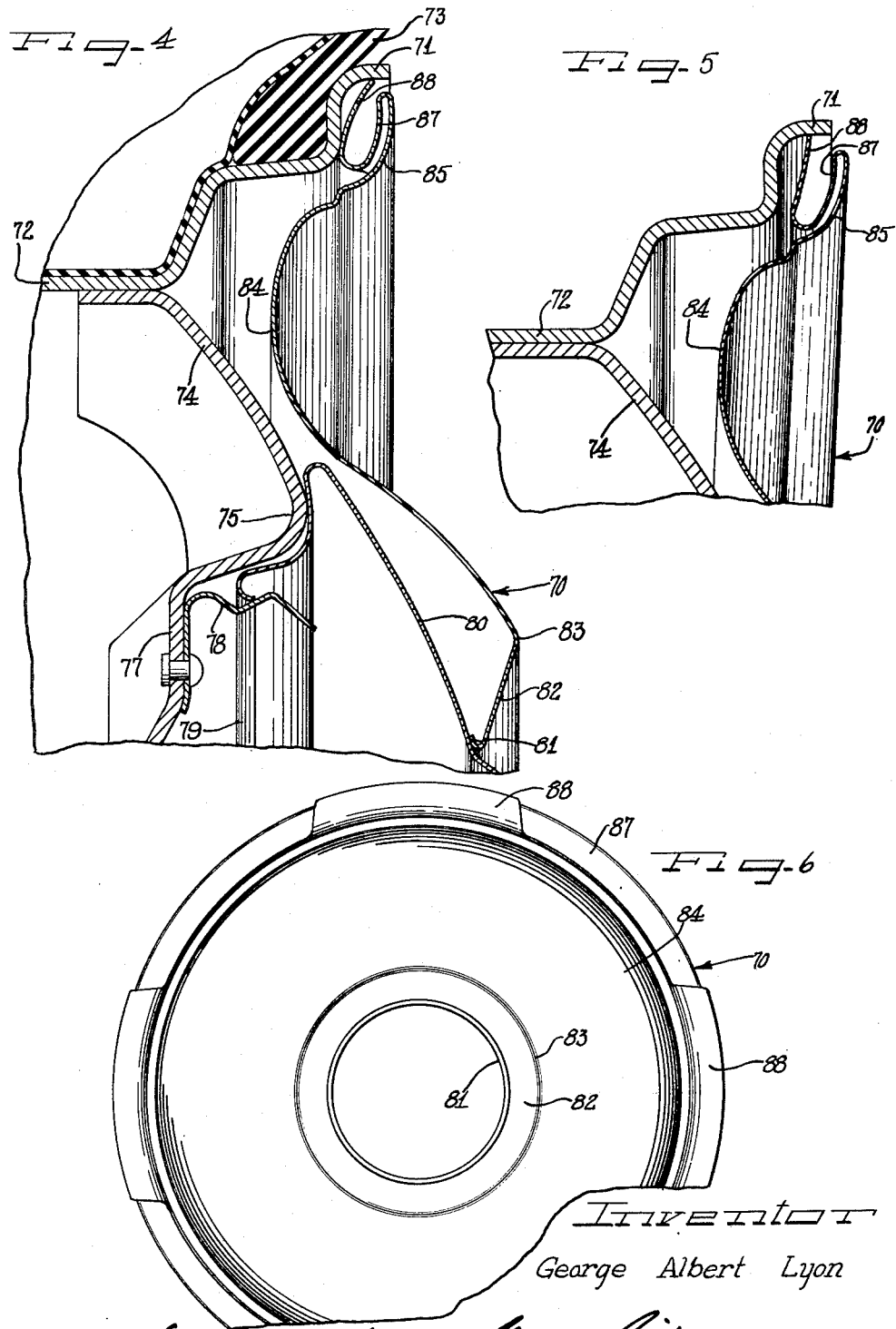

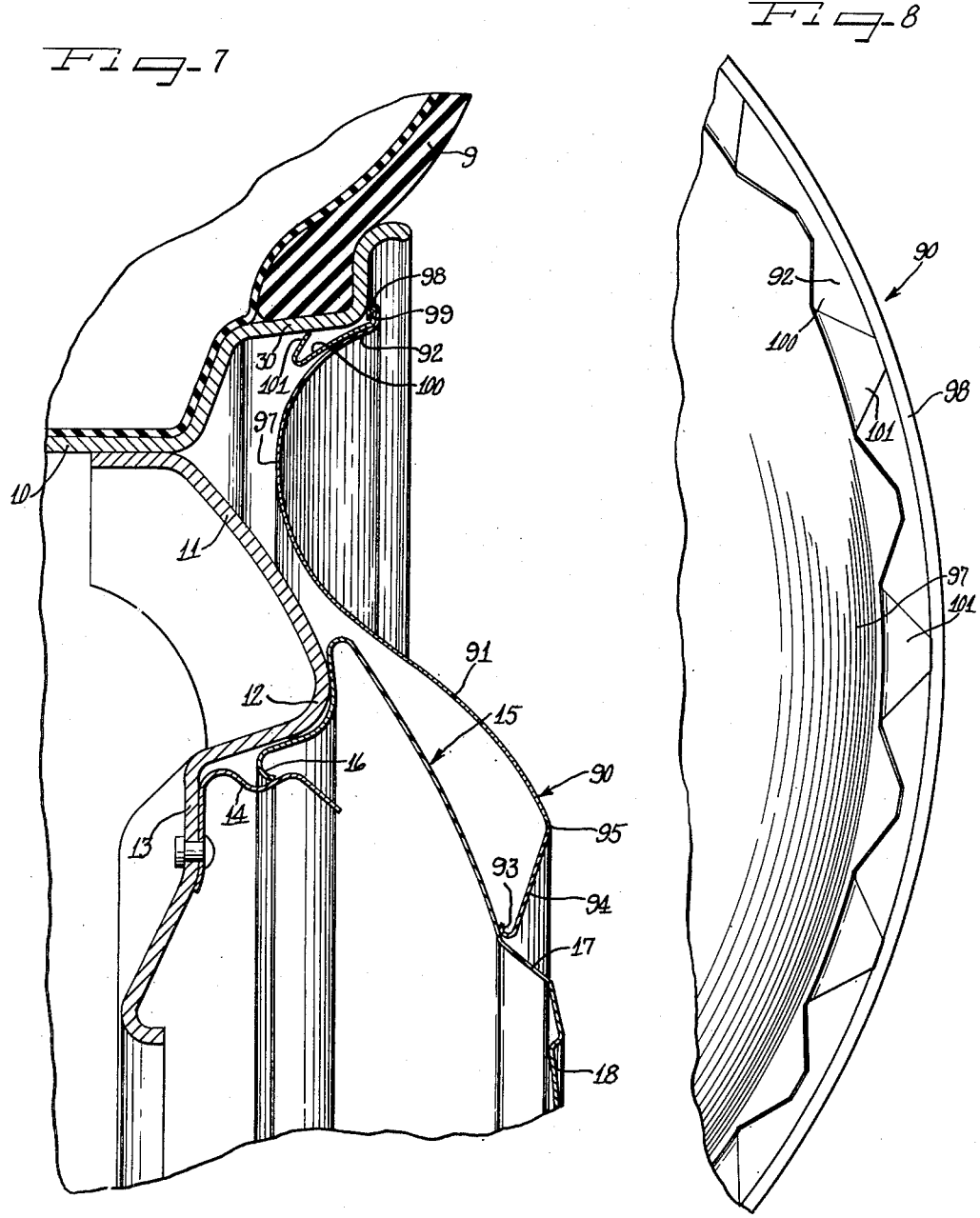

Patented Sept. 28, 1954

2,690,358

UNITED STATES PATENT OFFICE 2,690,358

WHEEL COVER

George Albert Lyon, Detroit, Mich.

Application May 6, 1952, Serial No. 286,299

9 Claims. (Cl. 301—37)

This invention relates to a wheel structure and more particularly to an ornamental wheel cover which can be used in overlapping relation with the hub cap on an automobile wheel in such manner that the hub cap cooperates with the cover in providing a pleasing complete cover for the exposed side of the wheel.

An object of this invention is to so interrelate a wheel cover ring with a hub cap that the central portion of the hub cap serves in part as a backing for the ring and also performs the additional function of supplementing the ornamental appearance of the ring.

Another object of this invention is to provide for the substantially complete covering of an exposed side of a wheel in such manner that the existing hub cap and the identifying insignia or emblem thereon can be utilized in the ensuing cover assembly.

In accordance with the general features of this invention there is provided in a cover structure for a wheel including a multi-flanged tire rim member and a body member having a detachable central hub cap thereon, a wheel cover comprising an annular ring with its radially outer margin provided with retaining means for detachable gripping engagement with a flange of the rim member, and having its radially inner margin turned radially and axially inwardly for bearing contact with the outer surface of the hub cap and whereby the portion of the hub cap inside the inner ring margin appears to be the central part of said annular ring.

Another feature of the invention relates to so forming the cover ring that it may be readily applied to or detached from the wheel without in any way interfering with the normal use of the central wheel hub cap.

Yet another feature of the invention relates to the use of a hub cap as a backing for the ornamental wheel ring and so that greater rigidity will be provided for the ring at its central portion whereby it will better be able to resist accidental indentation.

Other objects and features of this invention will more fully appear from the following detailed description of certain preferred embodiments thereof taken in view of the accompanying drawings and in which Figure 1 is a fragmentary side view of an automobile wheel assembly embodying the features of this invention and wherein a portion of the wheel ring is broken away to show the underlying portions of the wheel and hub cap;

Figure 2 is an enlarged fragmentary cross-sectional view taken on substantially line II—II of Figure 1 looking in the direction indicated by the arrows and showing the manner in which the ornamental wheel ring is backed up by the hub cap, the central portion of which projects through the center of the ring;

Figure 3 is a fragmentary cross-sectional view similar to the central portion of Figure 2 but showing a modified form of the ring and hub cap;

Figure 4 is a radial sectional view through a wheel and cover assembly showing a further modification;

Figure 5 is a radial sectional view similar to Figure 4 and showing the cover in process being pried from the wheel;

Figure 6 is a fragmentary rear elevational view of the cover ring of Figure 4;

Figure 7 is a radial sectional view through a wheel and cover assembly showing another modification; and Figure 8 is a fragmentary enlarged rear elevational view of the cover ring of Figure 7.

As shown on the drawings:

In Figures 1 and 2 I have illustrated a more or less conventional wheel assembly which includes the usual automobile tire and tube assembly 9 supported in the customary way upon a multi-flanged drop center tire rim 10. This rim member 10, as is well known in the art, has projecting from it the usual valve stem which is indicated at 8 in Figure 1 and which must be accessible in the use of the wheel.

Also, the rim member 10 is attached to and carried upon a dished body member 11 which may be in the form of a stamping and includes a central bulged nose portion 12 and a bolt-on flange 13. This flange 13 may be detachably fastened by means of bolts and nuts (not shown) to a part on an axle in a manner well known to those familiar with the modern automobile.

Attached to the flange 13 are a plurality of axially outwardly projecting goose-neck like spring clips 14 which may be of any suitable number such, for example, as 3 to 5. These resilient clips 14 are so designed as to retain detachably a shell-like hub cap 15 on the nose portion 12 of the wheel. Actually, as is also well known in the art, the hub cap 15 includes an underturned skirt nested in the nose portion 12 and terminating in an edge 16 detachably engageable by the free extremities of the spring clips 14.

The hub cap 15 may be of any suitable configuration and preferably is made of sheet metal. It may, for example, be of the same shape shown in Figure 2 or in the form of the modification 55 shown in Figure 3, to be hereinafter described.

It is customary to provide the central portion of the hub cap 15 with an emblem indicative of the make of the car. To this end hub cap 15 is provided with a centrally bulged portion 17 having an emblem area 18. Sometimes these emblem areas are in color and in other instances they merely have some odd design which the public associates with the make of the car to which the particular wheel is applied.

Heretofore, when completed covers have been provided for the exposed outer side of the wheel, such as that shown in Figure 2, it has been common practice to discard the hub caps. In some cases objection has been voiced to this practice. Accordingly, it is the aim of this invention to provide a wheel cover ring which can be used to advantage with the hub cap and so as not to necessitate discarding of the hub cap. Such a ring is designated by the reference character 20.

Referring again to Figure 2, it will be perceived that the cover 20, which may be made of any suitable sheet material such, for example, as sheet metal, has a central curved bulged portion 21 terminating in a radially inner slanting marginal portion 22. The extreme inner edge of this margin 22 is formed into an underturned edge 23 arranged to bear or bottom on the base of the bulged central cap portion 17. In this manner the hub cap may be used as a backing for the ring 20. Radially outwardly of the portion 21 the ring 20 is symmetrically dished axially inwardly as shown at 24 and is then turned smoothly outwardly into a turned radially outer marginal edge 25.

The edge 25 has formed integral with it an axially rearwardly projecting flange 26 circumferentially spaced portions of which are formed into yieldable finger portions 27 terminating in angular extremities 28 for gripping engagement with the axial flange 30 of the rim 10.

In addition, the dished portion 24 of the cover ring is provided with a hole 29 (Figure 1) through which the valve stem 8 can project so as to be accessible from the exterior of the cover ring.

In Figure 3 a modification is shown wherein the central portion of the hub cap 55 and of the cover ring 60 are of a slightly different construction. It will be noted that the central portion 55 of the hub cap has a conical like central protuberance 56 which is the emblem adopted at the present time by one of the leading car manufacturers. As in the preferred form it is desired to use this emblem 56 in the ultimate wheel coverage so that it appears to be part of the cover ring 60.

To the foregoing ends the cover ring 60 has a central bulged portion 61 and a radially inclined inner margin 62 terminating in a turned edge 63 and adapted to bear at 65 on the hub cap 55. The inclined portion 62 may be corrugated, as shown, for the purpose of enhancing the central ornamental effect of the cover assembly.

In the modification of Figure 4 the cover assembly is shown wherein a cover ring 70 of much the same general construction as the cover ring 20 of Figure 2, is retained on the wheel by engagement with a terminal flange 71 of a multiflange tire rim 72 which is adapted to support a pneumatic tire and tube assembly 73. A wheel body 74 supports the tire rim 72 and has a nose bulge 75 about a central bolt-on flange 77 carrying retaining spring clips 78 for retaining engagement with an inner reinforcing flange 79 of a hub cap 80 seated on the nose bulge 75.

The cover ring 70 has its inner margin of smaller internal diameter than the outside diameter of the hub cap 80 so that in assembly the inner margin of the cover ring will overlap the margin of the hub cap as shown. At its inner extremity the cover ring 70 has an underturned reinforcing and finishing bead-like flange 81 from which the margin extends slantingly generally radially and axially outwardly as indicated at 82 and terminates in a juncture peak or ridge 83. From this the cover slopes inwardly radially outwardly and axially inwardly into a transversely dished annular portion 84. Radially outwardly, the portion 84 merges with a generally radially and axially outwardly extending convex annular marginal portion 85 to extend into substantial concealing relation to the tire rim terminal flange 71.

For retaining the cover ring 70 on the wheel, the marginal portion 85 is turned under and generally radially inwardly to provide a marginal underturned flange 87 which is provided with a plurality of equally spaced generally axially inwardly and radially outwardly turned retaining fingers 88 which are engageable with the axially outwardly extending portions of the terminal flange 71 which for this purpose is formed substantially cylindrical as shown in Figures 4 and 5 but may be of the same curved form as shown in Figure 2.

It will be understood that the relative axial relationship of the turned edge 81 and the shoulders provided by the retaining fingers 88 is such that when the shoulders of the retaining fingers bear against the radially extending portion of the terminal flange 71, the inner edge 81 which abuts the hub cap 80 will be under substantial tension to avoid rattling.

In applying the cover 70 to the wheel, the retaining fingers 88 are disposed in substantially centered relation against the tip of the terminal flange 71 and the cover ring is pressed inwardly until the shoulders of the fingers 88 rest against the inner side of the terminal flange 71 and the tips of the retaining fingers 88 engage in biting relation against the radially inwardly facing surface of the terminal flange 71 to thereby hold the cover in place on the wheel.

For removing the cover ring 70, a pry-off tool such as a screw driver or the like is applied between the tip of the terminal flange 71 and the underturned marginal flange 87 and outward leverage applied until the retaining finger adjacent the pry-off force is turned, as shown in Figure 5, and can then by further application of pry-off force slide out of engagement with the terminal flange 71.

In the modification of Figures 7 and 8 a wheel of the same kind as shown in Figure 2 is depicted and similar reference numerals indicate identical parts. The hub cap 15 is also identical as in Figures 1 and 2.

However, in Figures 7 and 8 a cover ring 90 is shown which is a composite of a cover body 91 and a cover retaining ring 92. Whereas the cover body 91 may be formed as a stamping, the retaining ring 92 may be formed as a rolled section.

The cover body 91 includes an inner underturned edge portion 93 which bears against the hub cap on a diameter which is substantially less than the diameter of the hub cap so that the cover ring overlaps a substantial portion of the hub cap. A radially and axially outwardly sloping portion 94 extends from the underturned edge 93 to a ridge 95. Thence the cover body 91 slopes radially outwardly and axially inwardly into a symmetrically dished portion 97. The outer margin of the dished portion 97 is of a diameter to overlie the juncture of the intermediate flange 30 with the terminal flange of the tire rim 10.

For connecting the cover retaining ring 92 to the cover body 91, the outer margin of the cover body is turned under at 98 to crimp in place an outturned flange 99 on the generally radially and axially inwardly extending retaining ring 92. The retaining ring 92 has a series of resilient retaining fingers 100 extending therefrom and each formed with a radially and axially outwardly turned resilient retaining terminal 101 engageable retainingly against the intermediate flange 30 of the tire rim.

The cover ring 90 is applied to the wheel in the same manner as the cover ring 20 of Figure 2, namely, by centering the cover ring on the wheel and then pressing the same inwardly until the retaining fingers 100 make retaining engagement with the intermediate flange 30 of the tire rim. Pry-off of the cover ring 90 is accomplished by inserting a pry-off tool under the multi-layer bead at the outer periphery of the cover and levering axially outwardly thereon.

It will be observed that in all forms of the cover, the ring cover member has the inner diameter smaller than the diameter of the hub cap so as to substantially concealingly overlap the hub cap. Furthermore, in each instance the cover ring is self-centering and is highly adaptable to inequalities or inaccuracies and manufacturing tolerances in the wheel and in the associated hub cap.

In the modifications of Figures 3, 4 and 7, as well as in the preferred form of Figure 1, the cover ring is preferably made of sheet metal and may be very economically manufactured on a large production basis from sheet metal stampings. The rings may be finished in any desirable manner, although excellent results may be obtained by providing them with a highly lustrous external finish, such as is obtained by chromium plating or the like and buffing to a high polish.

In applying the cover ring of any form herein to the wheel the valve stem hole in the ring is first aligned with the valve stem and then the cover is pressed axially home until it bottoms against the hub cap. In this position the resilient retaining fingers are stressed and are in tight gripping engagement with the rim flange.

Removal of the cover ring may be easily effected by the insertion of the blunt end of a pry-off tool under the turned outer edge of the cover and by the forcible prying of the cover ring from the wheel.

The foregoing operations are common in all forms of the invention. In addition when any form of the cover ring is on the wheel the central portion of the hub cap telescopes the ring and gives the illusion of being an integral part of the cover ring.

The present application is a continuation-in-part of my copending application Serial No. 124,177, filed October 28, 1949, and abandoned in favor of the present application.

It will be understood that modifications and variations may be effected without departing from the scope of the novel concepts of the present invention.

I claim as my invention:

1. In a wheel structure including a multi-flanged tire rim member and a body member having a detachable central hub cap thereon, a wheel cover comprising an annular ring with its radially outer margin provided with retaining means for detachable gripping engagement with a flange of the rim member, and having its radially inner margin arranged for bearing contact with the outer surface of the hub cap and whereby the central portion of the hub cap inside said inner margin appears to be the central part of said annular ring, the inner diameter of the ring being smaller than the diameter of the hub cap so as to substantially concealingly overlap the hub cap.

2. In a wheel structure including a multi-flanged tire rim member and a body member having a detachable central hub cap thereon, a wheel cover comprising an annular ring with its radially outer margin provided with retaining means for detachable gripping engagement with a flange of the rim member, and having its radially inner margin arranged for bearing contact with the outer surface of the hub cap and whereby the central portion of the hub cap inside said inner margin appears to be the central part of said annular ring, said radially inner margin of the ring being bulged axially outwardly and then radially and axially inwardly to a point of juncture with the outer surface of the hub cap, the inner diameter of the ring being smaller than the diameter of the hub cap so as to substantially concealingly overlap the hub cap.

3. In a wheel structure including a multi-flanged tire rim member and a body member having a detachable central hub cap thereon, a wheel cover comprising an annular ring with its radially outer margin provided with retaining means for detachable gripping engagement with a flange of the rim member, and having its radially inner margin arranged for bearing contact with the outer surface of the hub cap and whereby the central portion of the hub cap inside said inner margin appears to be the central part of said annular ring, said radially inner margin of the ring being bulged axially outwardly and then radially and axially inwardly to a point of juncture with the outer surface of the hub cap, the inner diameter of the ring being smaller than the diameter of the hub cap so as to substantially concealingly overlap the hub cap, and said hub cap having its central portion telescoping axially outwardly the inner edge of the annular ring with ornamental indicia axially outwardly of the ring inner edge.

4. In a wheel structure including a multi-flanged tire rim member and a body member having a detachable central hub cap thereon, a wheel cover comprising an annular ring with its radially outer margin provided with retaining means for detachable gripping engagement with a flange of the rim member, and having its radially inner margin arranged for bearing contact with the outer surface of the hub cap and whereby the central portion of the hub cap inside said inner margin appears to be the central part of said annular ring, the inner diameter of the ring being smaller than the diameter of the hub cap so as to substantially concealingly overlap the hub cap, the outer portion of said ring being symmetrically curved into the wheel at the juncture of the rim and body members and being formed outwardly thereof into a turned outer edge including said retaining means which comprises resilient fingers for detachably gripping the rim flange to hold the ring on the wheel and in tensioned engagement with the hub cap.

5. In a wheel structure including a multi-flanged tire rim member and a body member having a detachable central hub cap thereon, a wheel cover comprising an annular ring with its radially outer margin provided with retaining means for detachable gripping engagement with a flange of the rim member; and having its radially inner margin arranged for bearing contact with the outer surface of the hub cap and whereby the central portion of the hub cap inside said inner margin appears to be the central part of said annular ring; the inner diameter of the ring being smaller than the diameter of the hub cap so as to substantially concealingly overlap the hub cap, said ring retaining means comprising a plurality of resilient fingers for gripping a flange of the rim member and being resiliently stressed upon application of the cover to the wheel for holding the ring in tensioned engagement with the hub cap.

6. In a wheel structure including a tire rim and a wheel body having thereon a central hub cap, a cover ring of a smaller inner diameter than the outer diameter of the hub cap and having the inner margin of the cover ring extending to an outer diameter for substantial overlying concealing relation to the tire rim and having means for retaining the cover ring on the wheel, said means comprising an integral underturned portion of the outer margin of the cover ring having retaining fingers thereon grippingly engaging a flange of the tire rim.

7. In a wheel structure including a tire rim and a wheel body having thereon a central hub cap, a cover ring of a smaller inner diameter than the outer diameter of the hub cap and having the inner margin of the cover ring extending to an outer diameter for substantial overlying concealing relation to the tire rim and having means for retaining the cover ring on the wheel, said means comprising an integral underturned portion of the outer margin of the cover ring having retaining fingers thereon grippingly engaging a flange of the tire rim, said retaining means comprising an underturned portion of the outer margin of the cover ring having thereon generally radially outwardly extending retaining fingers retainingly engaging with the terminal flange of the tire rim.

8. In a wheel structure including a tire rim and a wheel body having thereon a central hub cap, a cover ring of a smaller inner diameter than the outer diameter of the hub cap and having the inner margin of the cover ring overlapping the outer margin of the hub cap, said cover ring extending to an outer diameter for substantial overlying concealing relation to the tire rim and having means for retaining the cover ring on the wheel, said retaining means comprising a separate retaining ring secured to the outer margin of the cover ring and retainingly extending rearwardly therebehind for retaining engagement with a flange of the tire rim.

9. In a wheel structure including a multi-flanged tire rim member and a body member having a detachable central hub cap thereon, an annular wheel cover having a radially outer margin on an annular radially and axially inwardly extending portion for overlying the tire rim and joined to a radially inner annular portion extending generally radially inwardly and axially outwardly for overlying the wheel body and the hub cap and with its radially inner margin arranged for bearing contact with the outer surface of the hub cap and whereby the central portion of the hub cap inside said inner margin appears to be the central part of said annular ring, said radially inner margin being bulged axially outwardly and then radially and axially inwardly to a point of juncture with the outer surface of the hub cap, the inner diameter of the annular cover being smaller than the diameter of the hub cap so as to substantially concealingly overlap the hub cap, said first mentioned cover portion with the outer margin being provided with a turned flange, and cover retaining means for detachable gripping engagement with a flange of the rim member and attached to the cover in interengaged relation with said underturned flange.

References Cited in the file of this patent

UNITED STATES PATENTS

| Number | Name | Date |
|---|---|---|
| Re. 19,467 | Lyon | Feb. 12, 1935 |
| 2,368,228 | Lyon | Jan. 30, 1945 |
| 2,383,071 | Mulhern | Aug. 21, 1945 |